UNITED STATES PATENT OFFICE.

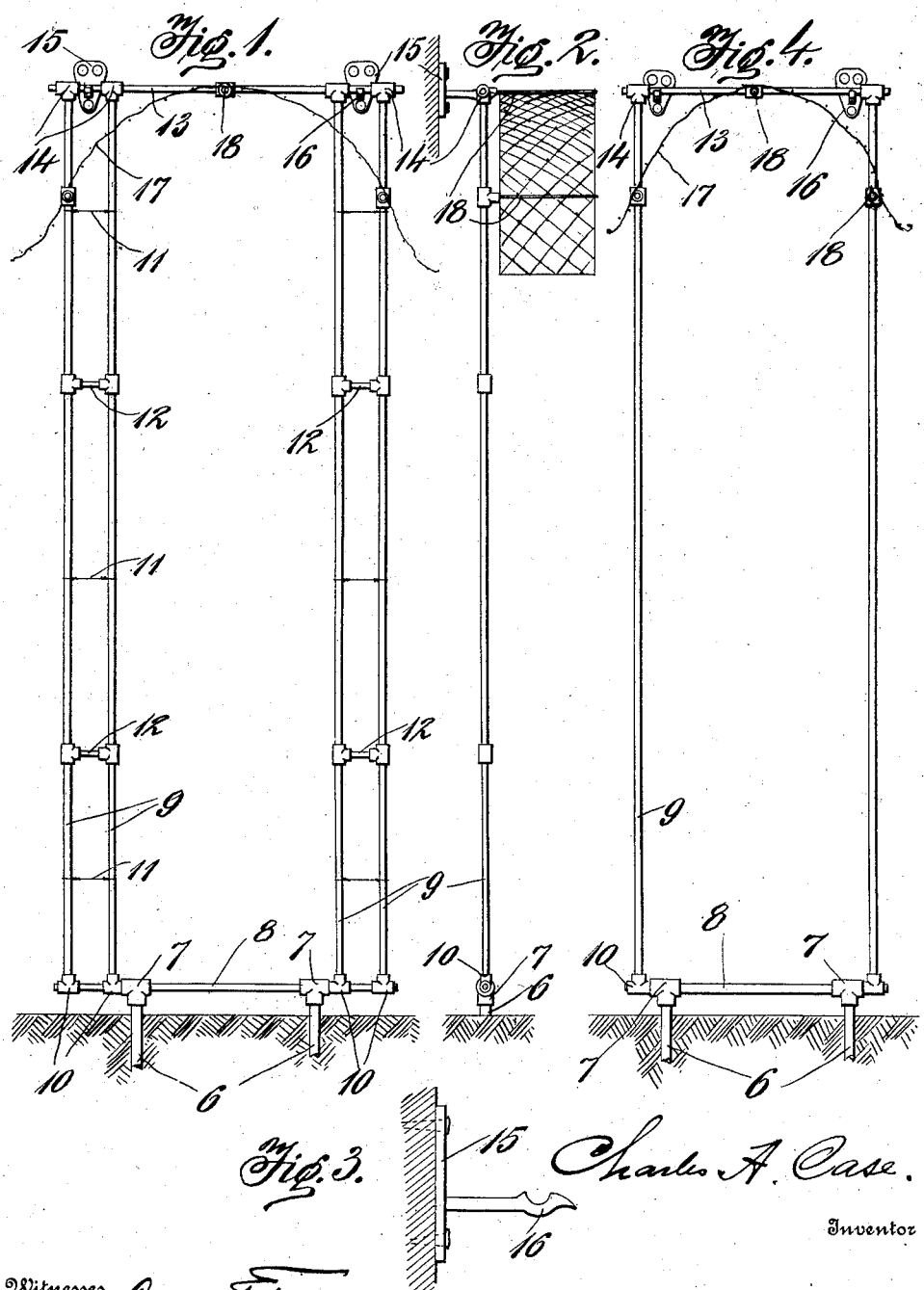

CHARLES A. CASE, OF SHELTER ISLAND, NEW YORK.

TRELLIS.

No. 905,647.

Specification of Letters Patent.

Patented Dec. 1, 1908.

Application filed March 31, 1908. Serial No. 424,417.

*To all whom it may concern:*

Be it known that I, CHARLES A. CASE, a citizen of the United States, residing at Shelter Island, in the county of Suffolk and State of New York, have invented certain new and useful Improvements in Trellises, of which the following is a specification.

This invention relates to trellises for vines and flowers, and has for its object to provide an improved trellis capable of being applied to a house, around a window, door or veranda, and adapted to be folded or turned down to horizontal position for such purposes as trimming the vines or painting the house.

The trellis may be cheaply constructed from materials which are easily accessible, consisting principally of small iron pipe or rods connected by T-fittings. The trellis also includes a projecting support at the top which when covered with vines will form a canopy or sun shade over the top of the window or door.

The construction of the trellis will be more evident from the following description and the accompanying drawings, in which Figure 1 is a front elevation thereof; Fig. 2 is a side elevation; Fig. 3 is a detail showing one of the spring catches which hold the trellis at the top. Fig. 4 is a front elevation of a modification.

Referring specifically to the drawings, 6 indicates posts conveniently made of rather large piping and driven into the ground to form a support for the trellis. These have T-fittings 7 at the top through which extends a lower cross rod or small pipe 8 which may be turned in said fittings and forms a hinge therewith. The ends of this rod project beyond the fittings at each side and support the standards 9 which are connected thereto by T-fittings 10.

In the form shown in Fig. 1 there are two standards at each side; in the form shown in Fig. 4 there is only one standard at each side. When two standards are used they will preferably be connected at intervals by cross rods or wires 11 as well as by brace rods or short pipe sections 12 also united to the standards by T-fittings. The standards may be conveniently made of small iron pipe which gives lightness as well as strength.

At the top the standards are connected by a cross rod or pipe 13 united to the standards by T-fittings 14.

To maintain the trellis in upright position, brackets 15 are secured to the side of the house and have projecting spring fingers or hooks 16 with which the upper cross bar 13 may be engaged. These supports are preferably located at each upper corner of the trellis and they are so placed that by pressure or special effort the bar 13 may be sprung in or out of the hooks, which will yield sufficiently for this purpose.

At the top of the trellis an overhanging shade or canopy may be formed by means of a piece of woven wire 17 extending horizontally and curved to any decorative form desired. This is supported by rods 18 fastened to the standards 9 and cross piece 13 and projecting outwardly therefrom. This attachment will form an awning or canopy for the window or doorway to which the trellis is applied, without obstructing the view from the same.

The vines will be planted so as to grow up the standards at each side, whence they are run over the canopy and so give a pleasing appearance and decorative effect.

The trellis may be swung down to horizontal position by a smart pull thereon, sufficient to spring the bar 13 out of the hooks 16, when it may be turned down by reason of the hinges produced by the arrangement of the lower bar 8 and T-fittings 7. And it may be swung up into position and held by the hooks 16, sufficient pressure being used to force the upper cross bar 13 into said hooks. It may be made any width or height, to fit any window, door or veranda; or a series may be used to form an arbor.

I claim:

1. A trellis comprising a pair of supporting posts having openings in the top, a cross rod extending through said openings and forming a hinge joint, and standards mounted on said rod and connected together at the top.

2. A trellis comprising a support at the bottom, a frame having spaced standards hinged thereto, and a canopy projecting horizontally at the top of the frame.

In testimony whereof I affix my signature, in presence of two witnesses.

CHARLES A. CASE.

Witnesses:
M. L. MORTON,
GEO. E. TEW.